United States Patent [19]

Swain

[11] Patent Number: 5,364,237
[45] Date of Patent: Nov. 15, 1994

[54] COMPRESSOR ASSEMBLY HAVING A CLUTCH TRIGGERED BY A SMALL COMPRESSOR AND ACTUATED BY DISCHARGE PRESSURE

[75] Inventor: James C. Swain, Columbus, Ohio

[73] Assignee: General Motors Corporation, Detroit, Mich.

[21] Appl. No.: 64,309

[22] Filed: May 20, 1993

[51] Int. Cl.⁵ ............... F04B 9/00; F16D 25/0635
[52] U.S. Cl. .................... 417/319; 417/223; 192/85 A
[58] Field of Search .............. 417/223, 319, 440; 418/69; 192/85 A, 85 R

[56] References Cited

U.S. PATENT DOCUMENTS

| | | | |
|---|---|---|---|
| 1,860,278 | 5/1932 | Eckels | 417/269 |
| 2,191,629 | 2/1940 | Scott et al. | 192/85 A |
| 2,373,909 | 4/1945 | Penn | 417/316 |
| 2,807,146 | 6/1953 | Jackson | 62/4 |
| 2,992,769 | 7/1961 | Mawzanera | 418/69 |
| 3,142,369 | 7/1964 | Atkins | 192/3.24 |
| 3,278,110 | 10/1966 | Heidorn | 417/319 |
| 3,612,237 | 10/1971 | Honda | 192/85 AA |
| 3,817,660 | 6/1974 | Knowles et al. | 417/319 |
| 3,910,164 | 10/1975 | Swadner et al. | 92/128 |
| 4,296,851 | 10/1981 | Pierce | 192/846 |
| 4,428,718 | 1/1984 | Skinner | 417/223 |
| 4,468,181 | 8/1984 | Sakamoto | 418/55 |
| 4,616,742 | 10/1986 | Matsushita | 192/84 C |
| 4,715,800 | 12/1987 | Nishizawa et al. | 418/69 |
| 4,828,463 | 5/1989 | Nishizawa et al. | 417/307 |
| 5,273,409 | 12/1993 | Swain | 417/319 |

Primary Examiner—Richard A. Bertsch
Assistant Examiner—Peter Korytnyk
Attorney, Agent, or Firm—Patrick M. Griffin

[57] ABSTRACT

A compressor assembly for pumping a recirculating refrigerant including input and output shafts rotatably supported within a housing and a pressure responsive clutch disposed therebetween for selectively translating torque from the input shaft to the output shaft to drive the compressor. An auxiliary clutch compressor is employed for generating an auxiliary refrigerant discharge pressure and a control valve is moveable between first and second positions to either route refrigerant discharge pressure away from the clutch or to bear upon the clutch so as to translate torque between the input and output shafts. The auxiliary compressor includes a piston and a cylinder with the piston operatively mounted to an eccentric portion of the input shaft and driven by the input shaft for reciprocal motion within the cylinder to generate an auxiliary refrigerant discharge pressure.

4 Claims, 3 Drawing Sheets

COMPRESSOR ASSEMBLY HAVING A CLUTCH TRIGGERED BY A SMALL COMPRESSOR AND ACTUATED BY DISCHARGE PRESSURE

BACKGROUND OF THE INVENTION

1. Technical Field

The subject invention is directed toward a compressor having a clutch mechanism for translating torque between an input power source and a compressor drive shaft where the clutch is initially actuated by the discharge from a small, continuously driven auxiliary compressor to begin torque translation and then responsive to the primary compressor discharge pressure to bring about full torque translation between the input power source and the compressor drive shaft to actuate the compressor.

2. Description of the Prior Art

Fluid pumping assemblies such as refrigerant compressors used for compressing a recirculating refrigerant in automotive air conditioning systems generally include some type of clutch mechanism to translate power from a power input source to the drive shaft of the compressor. One standard clutch mechanism commonly in use today includes a continuously driven pulley which is rotatably supported about a tubular extension of a clutch housing via ball bearings. The pulley is driven from the power take off of an automotive engine using a belt in the form of an endless loop as is commonly known in the art. An electromagnetic coil or solenoid generates an electromagnetic force which acts to draw an armature plate across a predetermined gap into frictional engagement with a rotating clutch friction plate. The armature plate is movably mounted to a hub using springs or an elastomeric support member. The hub, in turn, is fastened to a compressor drive shaft. When the coil is energized, the clutch friction plate imparts rotation to the armature plate which, in turn, causes the hub and the compressor drive shaft to rotate thereby driving the compressor.

Examples of electromagnetically actuated clutches employed with refrigerant compressors can be found at U.S. Pat. No. 4,296,851, issued to Pierce on Oct. 27, 1981; U.S. Pat. No. 4,616,742 issued to Matsushita on Oct. 14, 1986 and the clutches disclosed in pending U.S. patent applications entitled "High Dampening Soft Torque Cushion With Buckling Constraints" and "Clutch Field Operated Oil Injector Valve", both of which are assigned to the assignee of the subject invention.

Although clutches of the type disclosed in the aforementioned patents and described above have long been employed in compressors used in automotive applications, they are not without their problems. One of the most common sources of warranty problems for air conditioning compressors comes from the failure of the solenoid or coil. The clutch coils are expensive and difficult to replace and typically when they fail, the entire compressor is scrapped.

In addition, the externally mounted, dry, electromagnetic clutches are not tolerant of slow engagement which is a desirable characteristic to the consumer. Such clutches wear excessively if engaged slowly. The provision of slow engagement also increases the cost of the electrical control means.

Other clutch mechanisms have been disclosed which employ the compressor discharge pressure to cause frictional engagement between adjacent clutch plates thereby translating torque between input and output shafts. One such example of this type of clutch mechanism can be found in U.S. Pat. No. 4,715,800 issued to Nishizawa et al on Dec. 29, 1987 and its divisional patent No. 4,828,463 issued on May 9, 1989. The disclosure of both of the Nishizawa patents are identical and therefore will be discussed collectively.

The Nishizawa '800 and '463 patents are directed toward a rotary compressor with a clutch and bypass control actuated by hydraulic and/or compressed fluid. More specifically, these patents disclose a compressor having an electromagnetically actuated valve which controls the flow from a continuously driven small trochoid pump which generates a hydraulic discharge pressure which acts on a pressure responsive clutch plate to cause an initial drive of the compressor. The compressor discharge pressure is then employed to act on the pressure responsive clutch plate to cause full clutch engagement to drive the compressor.

Although the Nishizawa '800 and '463 compressors do not disclose the use of a clutch which employs a solenoid or clutch coil, the porting necessary to cause clutch actuation using a hydraulic fluid as well as a refrigerant discharge pressure in the Nishizawa compressor is rather complex and increases the cost of such compressors.

SUMMARY OF THE INVENTION AND ADVANTAGES

The subject invention overcomes the problems in the prior art in a compressor which is actuated by the pressure generated by a continuously driven small compressor. Additionally, the clutch is also responsive to the main compressor discharge pressure to cause full torque translation between the input and output shafts without the use of an expensive clutch coil.

More specifically, the subject invention is directed toward a compressor assembly for pumping a recirculating refrigerant including a compressor housing defining a suction chamber for receiving refrigerant at a first predetermined pressure and a discharge chamber for receiving compressed refrigerant at an elevated second predetermined pressure. An input shaft and an output shaft are rotatably supported within the housing and a clutch means is disposed therebetween for selectively translating torque from the input shaft to the output shaft to drive the compressor.

The clutch means includes an input friction plate mounted for rotation with the input shaft and an output friction plate mounted for rotation with the output shaft and an actuator means which is responsive to refrigerant pressure to bring the input and output friction plates into engagement thereby translating torque from the input shaft to the output shaft to drive the compressor.

The assembly further includes an auxiliary clutch compressor means for generating an auxiliary refrigerant discharge pressure and a control valve means moveable between a first position to route the auxiliary refrigerant discharge pressure away from the actuator means and a second position to route the auxiliary refrigerant discharge pressure to bear upon the actuator means so as to bring the input and output friction plates into engagement at low force levels thereby translating a low torque between the input and output shafts to drive the compressor. The main compressor then generates a primary compressor discharge pressure. The control valve is also employed to route the primary compressor discharge pressure to bear upon the actuator means to cause full engagement between the input and output friction plates and thereby cause full torque translation between the input and output shafts. The auxiliary compressor means includes a piston and a cylinder with the piston operatively mounted to an eccentric portion of the input shaft and continuously driven by the input shaft for reciprocal motion within the cylinder to generate the auxiliary piston pressure.

In this way, an efficient, cost effective, long-life, and slow engaging clutch can be employed using the discharge from a small, continuously driven auxiliary compressor and a primary compressor refrigerant discharge pressure to bring about torque translation between the compressor input and output shafts. This clutching function is accomplished without the need for expensive, bulky clutch coils and the attendant warranty problems which accompany clutches including such coils.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE BEST MODE OF CARRYING OUT THE INVENTION

Figure 1:
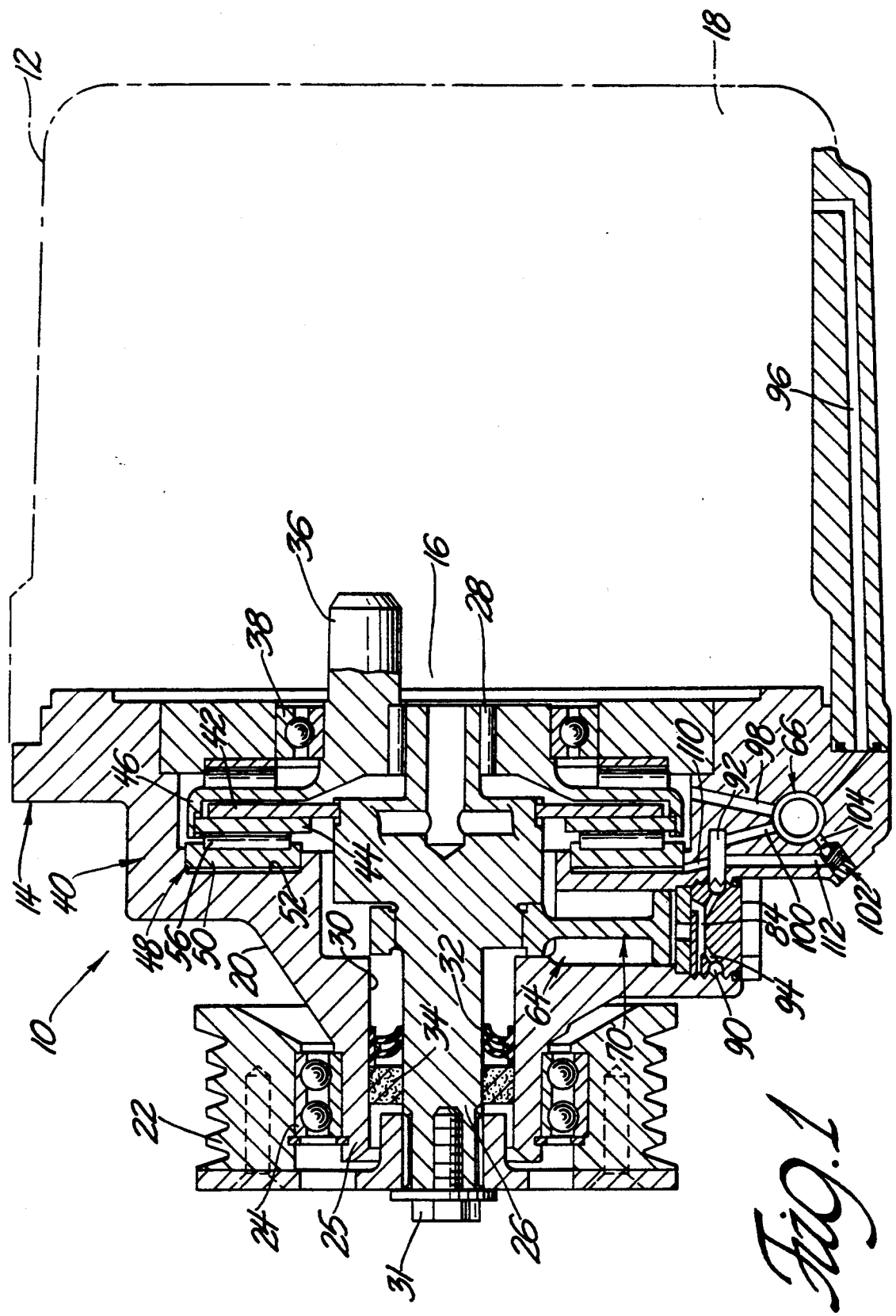
FIG. 1 is a cross-sectional side view of the compressor assembly illustrating the clutch triggered by a small compressor and actuated by discharge pressure of the subject invention.

A compressor assembly having a pressure actuated internal clutch triggered by a small auxiliary compressor is generally shown at (10) in FIG. 1. The compressor (10) may be of any type commonly employed in automotive air conditioning applications where the compressor is used to pump a recirculating refrigerant through the system which may include a condenser, evaporator etc. as is commonly known in the art. The compressor (10) includes a compressor housing (12), shown in phantom, and a clutch housing, generally indicated at (14), which is mounted to the compressor housing. A compressor mechanism (not shown) is supported within the compressor housing (12) and pumps the refrigerant through the air conditioning system. The compressor mechanism may include a scroll type compressor as shown for example in U.S. Pat. No. 4,468,181 issued to Sakamoto on Aug. 28, 1984; a radial compressor including a plurality of radially disposed pistons reciprocating in cylinders as shown for example in U.S. Pat. No. 3,910,164 issued to Swadner et al on Oct. 7, 1975 and assigned to the assignee of the subject invention; wobble plate type compressor assemblies as shown for example in U.S. Pat. No. 4,428,718 issued to Skinner on Jan. 31, 1984 and assigned to the assignee of the subject invention; a rotary compressor as shown for example in the Nishizawa '800 and '463 patents discussed above or any other compressor assembly employed to pump a recirculating refrigerant as is commonly known in the art. As such the disclosures of the above-identified prior art patents are incorporated herein by reference.

The compressor housing (12) defines a suction chamber (16) located nearest to the clutch housing (14) and a discharge chamber (18) located at the opposite end of the compressor housing (12). As is commonly known in the art, the suction chamber (16) receives refrigerant at a lower predetermined pressure and then delivers this low pressure refrigerant to the compressor mechanism which compresses the refrigerant and raises its pressure. The discharge chamber (18), on the other hand, is adapted to receive this compressed refrigerant at an elevated discharge pressure and then routes the refrigerant along to the next stage in the air conditioning system.

The clutch housing (14) is a substantially cup-shaped member which defines a stepped tubular extension (20) on its outer diameter. A rotor means in the form of a pulley (22) is rotatably mounted on ball bearings (24) about the end hub (25) of the tubular extension (20). The pulley (22) is typically coupled to the power take off of an automotive engine (not shown) via an endless loop belt (not shown), as is commonly known in the art.

A power input shaft (26) is rotatably supported by needle bearings (28) in the power output shaft (36) by the external pully bearing (24) and is operatively coupled to the pulley (22) through center post bolt (31) such that the input shaft (26) is continuously driven by the pulley (22). A teflon sealing member (32) and a felt ring (34) are employed about the input shaft (26) and opposite the needle bearings (28) to seal the inner workings of the compressor assembly (10) from the atmosphere. A power output shaft (36) is similarly rotatably supported by ball bearings (38) within the clutch housing (14) and is adapted to power the compressor mechanism housed within the compressor housing (12). As shown in the figures, the output shaft (36) is of the type which would be employed to drive a scroll type compressor as shown, for example, in the '181 Sakamoto patent, but it is to be understood that the shaft (36) could be configured to drive any other type of compressor.

The compressor assembly (10) further includes a clutch means, generally shown at (40) in FIG. 1, which is disposed between the power input shaft (26) and the power output shaft (36) for translating torque between the input and output shafts (26), (36), respectively. More specifically and referring now to FIG. 2, the clutch means (40) includes an input friction plate (42) mounted at its inner diameter to a radially enlarged portion (43) of the input shaft (26) for rotation therewith. The input friction plate (42) is splined or otherwise moveably mounted to the enlarged portion (43) so as to be moveable axially along the shaft (26). An output friction plate (44) is mounted at its outer diameter to a cup-shaped portion (46) of the output shaft (36) for rotation therewith. As with the input friction plate (42), the output friction plate (44) is splined or otherwise movably mounted to the cup-shaped portion (46) of the output shaft (36) so as to be moveable in the axial direction as will be discussed in greater detail below.

The clutch means (40) further includes an actuator means, generally indicated at (48), which is responsive to refrigerant pressure to bring the input and output friction plates (42), (44) respectively into engagement thereby translating torque from the input shaft (26) to the output shaft (36) to drive the compressor. The actuator means (48) includes an annular disk (50) mounted within the cup-shaped clutch housing (14) and cooperating therewith to form a pressure chamber (52). Seals (not shown) are contained in grooves (not shown) on the outer diameter and the inner diameter of the annular disk (50) to prevent leakage from the actuator. The annular disk (50) does not rotate but is moveable axially under the refrigerant pressure acting in the pressure chamber (52) to cause the input and output friction plates (42), (44) to move axially into engagement with each other.

More specifically, the disk (50) moves the output friction plate (44) into frictional engagement with the input friction plate (42), which is sandwiched between the output friction plate (44) and the inner surface (54) of the cup-shaped member (46) of the output shaft (36). Annular thrust bearings (56) are employed between the disk (50) and the rotating output plate (44). Similarly, thrust bearings (58) are employed between the back (60) of the cup-shaped member (46) and a support structure (62) of the clutch housing (14) to stabilize the cup-shaped member (46) and to ground the forces generated by the clutch means (40).

Figure 2:
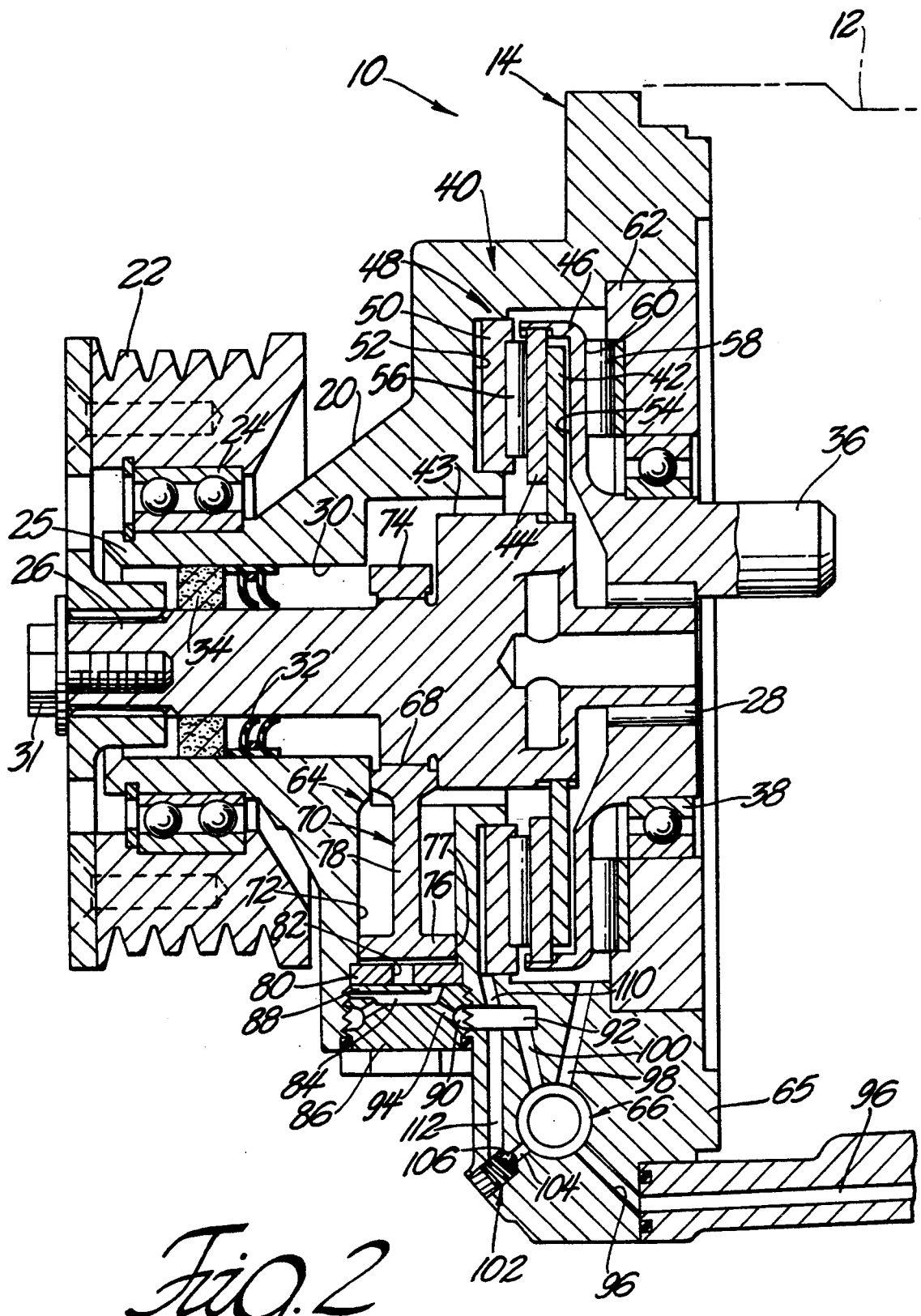
FIG. 2 is an enlarged cross-sectional side view of the clutch illustrating the small compressor of the subject invention.

The compressor assembly (10) further includes an auxiliary compressor means, generally shown at (64), for generating an auxiliary refrigerant discharge pressure and a control valve means, generally indicated at (66) in FIGS. 1 and 2. The control valve means (66) is disposed within a boss (65) in the clutch housing (14). The control valve (66) is moveable between a first position to route the auxiliary refrigerant discharge pressure away from the pressure chamber (52) and a second position to route the auxiliary refrigerant discharge pressure to the pressure chamber (52) so as to bear upon the disk (50) of the actuator means and thereby bring the input and output friction plates (42), (44), respectively, into engagement at a low force level. In this way, initial torque translation between the input and output shafts (26), (36) is generated to drive the compressor assembly (10) and thereby creates a primary compressor discharge pressure. In addition, and when the control valve means is in its second position, it routes this primary compressor discharge pressure to the pressure chamber (52) and to bear upon the disk (50) of the actuator means (48) to cause full force engagement between the input and output friction plates (42), (44) to thereby cause full torque translation between the input and output shafts (26), (36), respectively.

To this end, the input shaft (26) includes an eccentric portion (68) which is disposed adjacent the radially enlarged portion (43) of the input shaft (26). The auxiliary compressor means (64) includes a piston, generally indicated at (70), and a cylinder (72). The piston (70) is operatively mounted to the eccentric portion (68) and driven by the shaft (26) for reciprocal motion within the cylinder (72) to generate the auxiliary compressor pressure.

The piston (70) includes a ring portion (74) mounted about the eccentric (68) on the input shaft (26) and a head portion (76) adapted for reciprocal movement within the cylinder (72) to generate the auxiliary compressor discharge pressure. A stem portion (78) extends between and interconnects the head portion (76) and the ring portion (74). The head portion (76) has a spherical contour (77) on its outer diameter so that it can fit closely in the cylinder (72) and still accommodate the tilt imposed on it by the eccentric (68). A valve plate (80) having an exhaust port (82) is disposed at the bottom of the cylinder (72) and provides fluid communication between the cylinder (72) and an exhaust chamber (84) formed by a threaded insert (86) in the clutch housing (14) through flapper valve (88). An annular intermediate chamber (90) provides fluid communication between a gallery (92) and the exhaust chamber (84) via multiple connecting holes (94). The gallery (92) is in fluid communication with the pressure chamber (52) and the control valve (66) as will be discussed in greater detail below.

As alluded to above, the control valve (66) controls the flow of refrigerant from both the small auxiliary clutch compressor (64) and the primary compressor assembly (10) to either act on the disk (50) through the pressure chamber (52) or to prevent refrigerant from acting on the disk (50).

Figure 3:
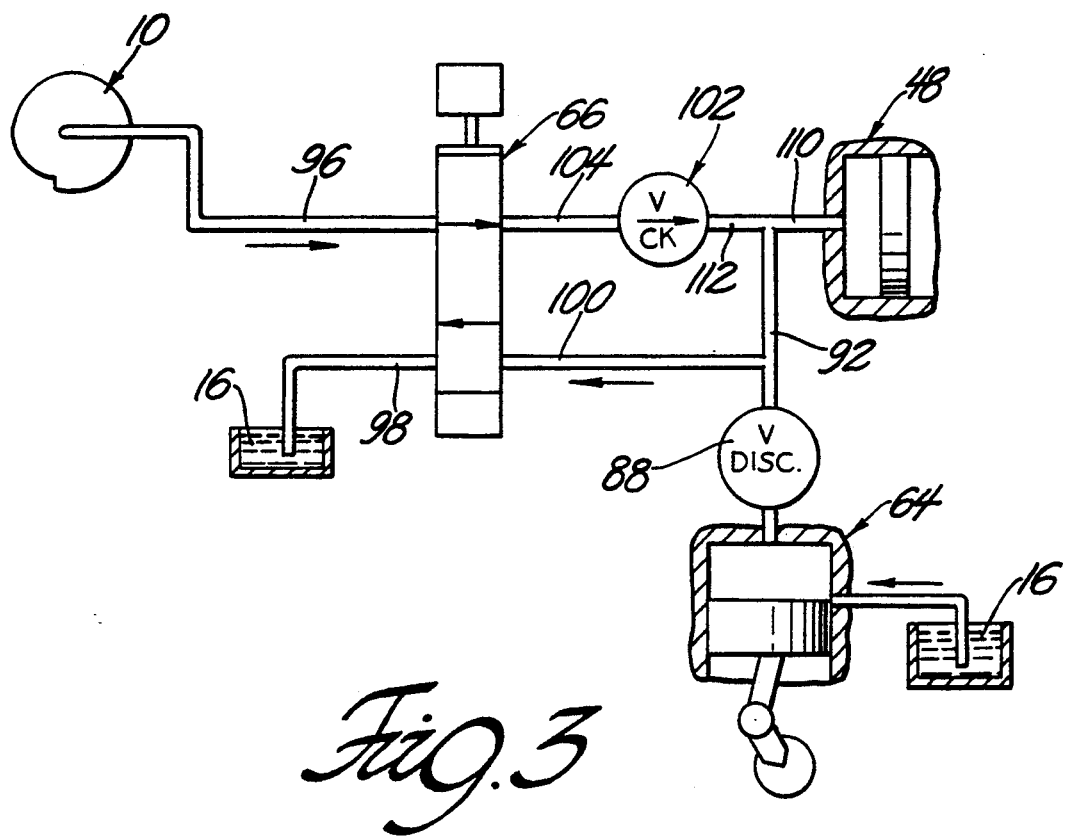
FIG. 3 is a schematic diagram illustrating the function of the control valve and the fluid communication between the main compressor, small compressor and the actuator of the subject invention.

More specifically, and with reference to FIGS. 2 and 3, a compressor discharge passage (96) extends between the control valve (66) and the compressor discharge chamber (18) and connects refrigerant at the elevated compressor discharge pressure from the discharge chamber (18) when the primary compressor (10) is driven. However, when the valve (66) is in its first position, the primary compressor is not driven and the control valve (66) blocks any refrigerant flow from the compressor discharge passage (96) and thereby prevents any primary compressor discharge pressure from acting on the disk (50) through the pressure chamber (52). This blocking action of the control valve (66) also prevents the wasteful loss of system pressure when the compressor is de-clutched. Similarly, the discharge pressure from the compressor pump (64) is delivered through the exhaust chamber (84), connecting holes (94), the intermediate passage (90), through the gallery (92) and the downwardly extending shunt passage (100) and routed through the valve (66) and vented to the suction chamber (16) through the relief passage (98). In this way, the discharge pressure from the auxiliary compressor (64) is also prevented from actuating the disk (50) through the pressure chamber (52).

When the control valve (66) is moved to its second position, the discharge from the auxiliary compressor (64) is prevented from passing through the valve (66). Therefore, a back pressure is created. The discharge pressure from the auxiliary compressor (64) thus bears against the annular disk (50) of the actuator (48) via the actuator passage (110) which interconnects the pressure chamber (52) and the gallery (92). The disk (50) is then moved axially against the thrust bearing (56) which squeezes the input and output friction plates (42), (44) together thereby translating torque between the input and output shafts (26), (36) and drives the primary compressor (10). The compressor (10) then generates an elevated refrigerant discharge pressure, which is connected from the discharge chamber (18) through the discharge passage (96), through the control valve (66) and is routed through the check valve passage (104) to bear against the check valve (102). As soon as this pressure rises to a level slightly higher than the auxiliary compressor discharge pressure it will unseat the ball (106) in the check valve (102) and is routed along the main delivery passage (112), across the gallery (92) and into the pressure chamber (52) through the actuator passage (110). In this way, the disk (50) exerts a higher force under the increased compressor refrigerant pressure acting within the pressure chamber (52) to bring the input and output friction plates (42), (44) into full frictional engagement resulting in full torque translation between the input and output shafts (26), (36) to drive the compressor.

Further, and once the primary compressor (10) generates a sufficient refrigerant discharge pressure, it acts upon and overcomes the discharge pressure from the auxiliary clutch compressor (64) via the gallery (92) and the auxiliary compressor (64) ceases to deliver any flow. The resultant load on the auxiliary clutch compressor (64) and therefore the input shaft (26) causes no problems because this load remains low through the incorporation of clearance volume between the upper portion of the piston (76) and the valve plate (80).

When the control valve (66) is moved from its second position back to its first position, the discharge from the auxiliary clutch compressor (64) is routed through the control valve (66) to the suction chamber (16) via the gallery (92), shunt passage (110) and the relief passage (98) and away from the pressure chamber (52). The control valve (66) also blocks the compressor refrigerant discharge pressure from acting on the disk (50) of the actuator (48) as will be discussed in greater detail below. Absent this refrigerant pressure acting within the pressure chamber (52), the disk (50) is then moved to the left as viewed in FIGS. 1 and 2 under the influence of return springs (not shown) thereby disengaging the friction plates (42), (44) and terminating torque translation between the input and output shafts (26), (36). As such, the primary compressor pumping action ceases which results in a cessation of the compressor discharge pressure. However, the continuously driven, auxiliary clutch compressor (64) continues to generate a discharge pressure which is simply routed to suction as was discussed above.

Figure 4:
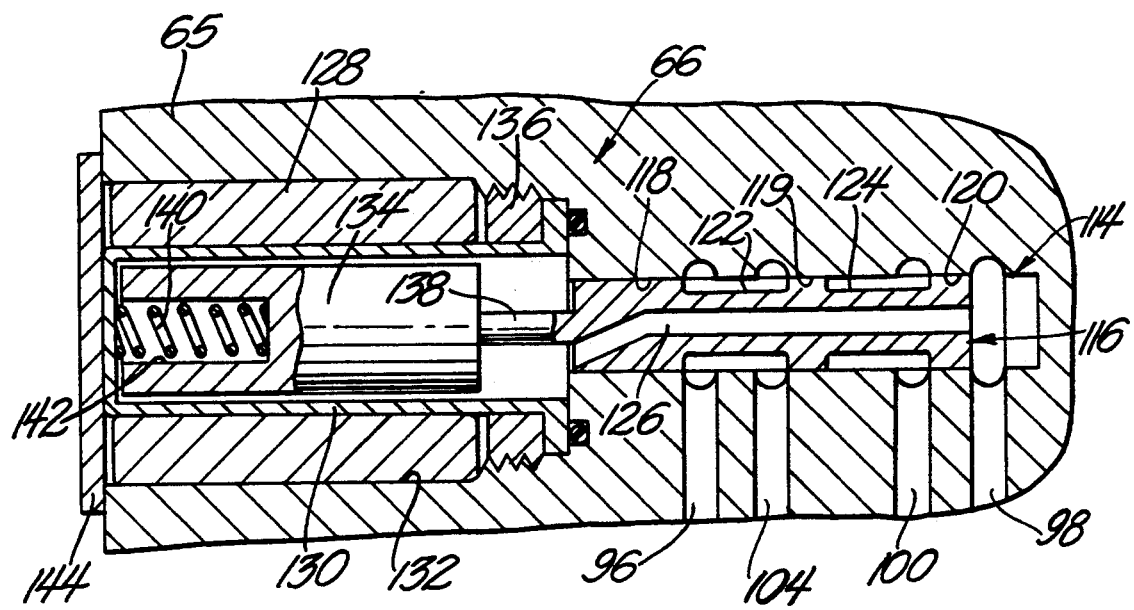
FIG. 4 is a cross-sectional side view of the control valve used to direct the flow of compressed refrigerant in the compressor assembly of the subject invention.

As can be seen in FIG. 4, the control valve means (66) is a solenoid actuated spool valve. The control valve (66) includes a valve body, generally indicated at (114), disposed within the boss (65) and a shuttle valve member, generally indicated at (116), which is moveable between first and second positions within the valve body (114). The valve member (116) includes three lands, (118), (119) and (120) having one diameter and a pair of reduced diameter portions (122), (124) which create flow passages through the valve body (114) to direct the flow of compressed refrigerant between the compressor discharge chamber (18), the auxiliary compressor (64) and the pressure chamber (52) or suction chamber (16) as will be discussed in greater detail below. The valve member (116) further includes a balance passage (126) which extends axially through the valve member (116) to equalize the pressures on either side of the lands (118), (120).

A valve coil (128) is disposed about a hermetic boundary tube (130) both of which are located in a coil chamber (132) of the valve means (66). A solenoid armature (134) is disposed within the boundary tube (130) which is secured in place with a hold down nut (136). The hermetic boundary tube (130) and hold-down nut (136) allow the valve coil (128) to be replaced without disturbing the refrigerant charge in the system. A connecting rod (138) extends between the valve member (116) and the solenoid armature (134). A coiled spring (140) is disposed within a recess (142) in the solenoid armature (134) and biases the armature (134) and therefore the valve men%her (116) to the right as viewed in FIG. 4. The valve (66) is sealed with a cover plate (144).

When the valve coil (128) is energized, it generates an electromagnetic force which acts on solenoid armature (134) to move to the left as viewed in FIG. 4 against the biasing force of the return spring (140). The valve member (116) is, in turn, moved to the left as shown in FIGS. 3 and 4. In this position, the land (120), blocks fluid communication between the auxiliary compressor (64) and the suction chamber (16) through shunt passage (100) and relief passage (98). Land (119) blocks the loss of discharge from the auxiliary compressor (64) through passage (96). As such, the pressure generated by the continuously driven, auxiliary compressor (64) is routed from the gallery (92) through the actuator passage (110) and into the pressure chamber (52). The discharge pressure generated by the auxiliary compressor (64) is sufficient to move the disk (50) axially to bring the friction plates (42), (44) into engagement thereby translating torque between the input and output shafts (26), (36) respectively. In this way, the compressor is driven and produces a compressor discharge pressure, which is connected through the compressor discharge passage (96) to the control valve means (66).

Further, and when the member (116) is in this second position, it provides fluid communication between the compressor discharge passage (96) and the pressure chamber (52) via the reduced diameter portion (122) of the valve member (116), through the check valve passage (104), the check valve (102), the main delivery passage (112) and the actuator passage (110). Under the influence of the full compressor discharge, the disk (50) exerts greater force and therefore squeezes the friction plates (42), (44) into full engagement so as to bring about full torque translation between the input and output shafts (26), (36), respectively.

As noted above, when the valve coil (128) is de-energized, the valve member (116) is returned to its first position under the influence of the spring (140). In this position the spring (140) biases the solenoid armature (134) and thus the valve member (116), to the right to its first position so as to cut off the fluid communication between the compressor discharge passage (96) and the main delivery passage (112) through the check valve (102). In this position, the land (118) blocks communication between the compressor discharge passage (96) and the check valve passage (104). Similarly, the pressure discharge from the auxiliary clutch compressor (64) is routed through the gallery (92), shunt passage (100) through reduced diameter portion (124) of the valve member (116) and to the suction chamber (16) via relief passage (98).

In this way, the pressure in the pressure chamber (52) and the suction chamber (16) are equalized and the disk (50) is moved to the left under the influence of the return springs (not shown) as viewed in FIGS. 1 and 2. The friction plates (42), (44) are therefore moved out of engagement. As such, torque translation between the input and output shafts (26), (36) is terminated.

The subject invention overcomes the problems in the prior art in a compressor which is actuated by the pressure generated by the continuously driven small auxiliary clutch compressor and which is also responsive to the main compressor discharge to cause full torque translation between the input and output shafts without the use of an expensive clutch coil. The invention thus provides for a cost effective compressor assembly having an efficient clutch mechanism which eliminates an expensive component of the prior art clutch mechanisms.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A compressor assembly for pumping a recirculating refrigerant, said assembly comprising;
    a compressor housing defining a suction chamber for receiving refrigerant at a first predetermined pressure and a discharge chamber for receiving compressed refrigerant at an elevated second predetermined pressure;
    an input shaft and an output shaft, said shafts rotatably supported within said housing and a clutch means disposed therebetween for selectively translating torque from said input shaft to said output shaft to drive said compressor;
    said clutch means being responsive to refrigerant pressure to translate torque from said input shaft to said output shaft to drive said compressor;
    said assembly further including an auxiliary clutch compressor means for generating an auxiliary refrigerant discharge pressure and a valve means moveable between a first position to route said auxiliary refrigerant discharge pressure away from said clutch means and a second position to route said auxiliary refrigerant discharge pressure to bear upon said clutch means so as to translate torque between said input and output shafts to drive said compressor;
    said input shaft including an eccentric portion, said auxiliary compressor means including a piston and a cylinder, said piston operatively mounted to said eccentric portion and driven by said shaft for reciprocal motion within said cylinder to generate said auxiliary refrigerant discharge pressure.

2. A compressor assembly for pumping a recirculating refrigerant, said assembly comprising;
    a compressor housing defining a suction chamber for receiving refrigerant at a first predetermined pressure and a discharge chamber for receiving compressed refrigerant at an elevated second predetermined pressure;
    an input shaft and an output shaft, said shafts rotatably supported within said housing and a clutch means disposed therebetween for selectively translating torque from said input shaft to said output shaft to drive said compressor;
    said clutch means including an input friction plate mounted for rotation with said input shaft and an output friction plate mounted for rotation with said output shaft and an actuator means responsive to refrigerant pressure to bring said input and output friction plates into engagement thereby translating torque from said input shaft to said output shaft to drive said compressor;
    said assembly further including an auxiliary clutch compressor means for generating an auxiliary refrigerant discharge pressure and a valve means moveable between a first position to route said auxiliary refrigerant discharge pressure away from said actuator means and a second position to route said auxiliary refrigerant discharge pressure to bear upon said actuator means so as to bring said input and output friction plates into partial engagement thereby translating torque between said input and output shafts to drive the compressor and generating a primary compressor discharge pressure and also to route said primary compressor discharge pressure to bear upon said actuator means to cause full engagement between said input and output friction plates to cause full torque translation between said input and output shafts;
    said input shaft including an eccentric portion, said auxiliary compressor means including a piston and a cylinder, said piston operatively mounted to said eccentric portion and driven by said shaft for reciprocal motion within said cylinder to generate said auxiliary refrigerant discharge pressure.

3. A compressor assembly as set forth in claim 1 or 2 further characterized by said piston including a ring portion mounted about said eccentric on said input shaft, a head portion adapted for reciprocal movement within said cylinder to generate said auxiliary compressor discharge pressure and a stem portion extending between and interconnecting said head portion and said ring portion.

4. A compressor assembly as set forth in claim 3 further characterized by said cylinder including an exhaust port for providing fluid communication between said cylinder and said control valve.

* * * * *